(12) United States Patent
Benisty

(10) Patent No.: US 10,740,000 B2
(45) Date of Patent: Aug. 11, 2020

(54) ADAPTIVE TRANSACTION LAYER PACKET FOR LATENCY BALANCING

(71) Applicant: Western Digital Technologies, Inc., San Jose, CA (US)

(72) Inventor: Shay Benisty, Beer Sheva (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/141,577

(22) Filed: Sep. 25, 2018

(65) Prior Publication Data
US 2019/0278477 A1     Sep. 12, 2019

Related U.S. Application Data

(63) Continuation-in-part of application No. 15/916,082, filed on Mar. 8, 2018, now Pat. No. 10,558,367.

(51) Int. Cl.
| | |
|---|---|
| *G06F 13/28* | (2006.01) |
| *G06F 3/06* | (2006.01) |
| *G06F 13/38* | (2006.01) |

(52) U.S. Cl.
CPC ............ *G06F 3/061* (2013.01); *G06F 3/0655* (2013.01); *G06F 3/0683* (2013.01); *G06F 13/28* (2013.01); *G06F 13/385* (2013.01)

(58) Field of Classification Search
CPC .............................. G06F 3/0611; G06F 3/0659
See application file for complete search history.

(56) References Cited

U.S. PATENT DOCUMENTS

| | | |
|---|---|---|
| 7,457,897 B1 | 11/2008 | Lee et al. |
| 9,292,465 B2 | 3/2016 | Trivedi et al. |
| 9,424,219 B2 | 8/2016 | Saghi et al. |
| 9,442,866 B1 | 9/2016 | Post et al. |
| 9,626,120 B1 | 4/2017 | Jia et al. |
| 9,678,904 B2 | 6/2017 | Volkening et al. |

(Continued)

FOREIGN PATENT DOCUMENTS

| | | |
|---|---|---|
| CN | 103336745 A | 10/2013 |
| CN | 103885909 A | 6/2014 |

OTHER PUBLICATIONS

Eshghi, et al.; SSD Architecture and PCI Express Interface; dated 2013; 28 total pages.

*Primary Examiner* — Edward J Dudek, Jr.
(74) *Attorney, Agent, or Firm* — Patterson & Sheridan, LLP; Steven H. Versteeg

(57) ABSTRACT

Embodiments of the present disclosure generally relate to a storage device fully utilizing a pipe interface by adaptively altering the size of data included in one or more packets sent to a host device. A maximum payload size for the packets and a reduced payload size for the packets are determined. The performance level of both the maximum payload size and the reduced payload size are then determined. The performance level of the maximum payload size is compared to the performance level of the reduced payload size to determine which payload size has the higher performance level. The payload size having the higher performance level is then selected, and the storage device sends data in packets in the size of the payload size having the higher performance level to the host device.

24 Claims, 13 Drawing Sheets

(56) References Cited

U.S. PATENT DOCUMENTS

| | | | |
|---|---|---|---|
| 2004/0100903 A1* | 5/2004 | Han | H04L 47/822 |
| | | | 370/230 |
| 2007/0192516 A1* | 8/2007 | Ibrahim | G06F 13/4054 |
| | | | 710/22 |
| 2011/0099456 A1* | 4/2011 | Dodson | G06F 13/4022 |
| | | | 714/758 |
| 2016/0179404 A1* | 6/2016 | Nanduri | G06F 3/061 |
| | | | 711/103 |
| 2016/0371221 A1 | 12/2016 | Rosenberg et al. | |
| 2017/0024333 A1 | 1/2017 | Rui et al. | |
| 2018/0107592 A1* | 4/2018 | Hashimoto | G06F 3/0619 |
| 2019/0004796 A1 | 1/2019 | Pelster et al. | |

* cited by examiner

| READ REQUEST SIZE 520 | HIGH WORKLOAD 530A | | | MEDIUM WORKLOAD 530B | | | LOW WORKLOAD 530C | | |
|---|---|---|---|---|---|---|---|---|---|
| | AVERAGE LATENCY 510A | MAX LATENCY 510B | MIN LATENCY 510C | AVERAGE LATENCY 510D | MAX LATENCY 510E | MIN LATENCY 510F | AVERAGE LATENCY 510G | MAX LATENCY 510H | MIN LATENCY 510I |
| 128 BYTES | $L_0$ uSec | $L_0$ uSec | $L_0$ uSec | $L_0$ uSec | $L_0$ uSec | $L_0$ uSec | $L_0$ uSec | $L_0$ uSec | $L_0$ uSec |
| 256 BYTES | $L_1$ uSec | $L_1$ uSec | $L_1$ uSec | $L_1$ uSec | $L_1$ uSec | $L_1$ uSec | $L_1$ uSec | $L_1$ uSec | $L_1$ uSec |
| 384 BYTES | $L_2$ uSec | $L_2$ uSec | $L_2$ uSec | $L_2$ uSec | $L_2$ uSec | $L_2$ uSec | $L_2$ uSec | $L_2$ uSec | $L_2$ uSec |
| 512 BYTES | $L_3$ uSec | $L_3$ uSec | $L_3$ uSec | $L_3$ uSec | $L_3$ uSec | $L_3$ uSec | $L_3$ uSec | $L_3$ uSec | $L_3$ uSec |
| ... | ... | ... | ... | ... | ... | ... | ... | ... | ... |
| 4096 BYTES | $L_{31}$ uSec | $L_{31}$ uSec | $L_{31}$ uSec | $L_{31}$ uSec | $L_{31}$ uSec | $L_{31}$ uSec | $L_{31}$ uSec | $L_{31}$ uSec | $L_{31}$ uSec |

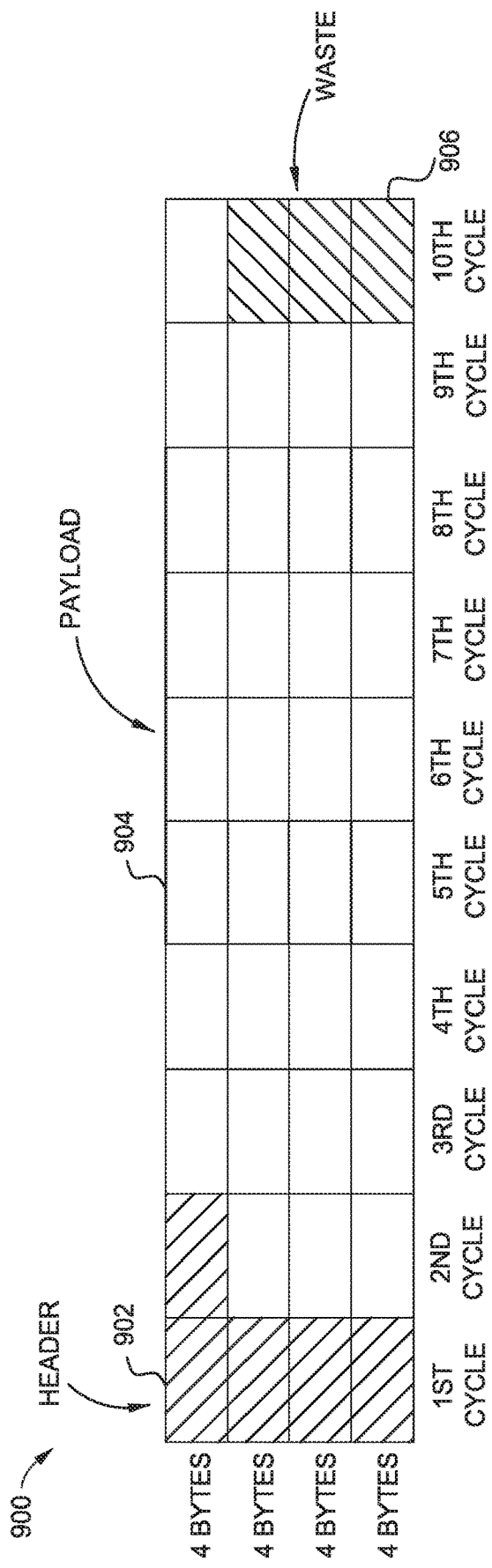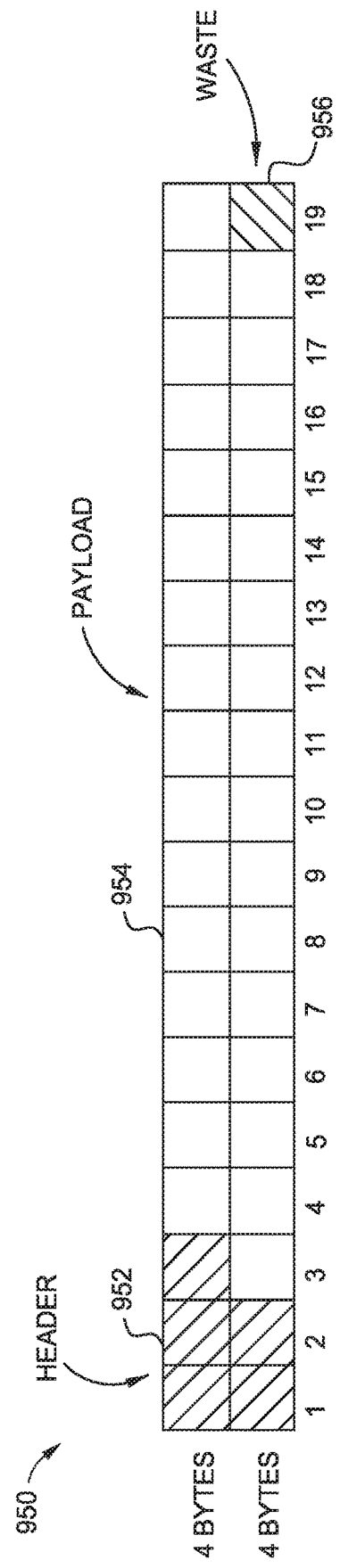

ADAPTIVE TRANSACTION LAYER PACKET FOR LATENCY BALANCING

CROSS-REFERENCE TO RELATED APPLICATIONS

This application is a continuation-in-part of co-pending U.S. patent application Ser. No. 15/916,082, filed Mar. 8, 2018. The aforementioned related patent application is herein incorporated by reference.

BACKGROUND OF THE DISCLOSURE

Field of the Disclosure

Embodiments of the present disclosure generally relate to a storage device, such as a solid state drive (SSD), and methods of sending data packets a host device.

Description of the Related Art

A host computer system may access data in a storage device, such as a flash memory device, for long term storage of data in a non-volatile memory storage media of the storage device. The host computer system and storage device may transmit data to each other as data packets. The size of the data packet is set to a default maximum size. This default maximum size may adversely impact completion of memory requests, or result in excess waste being transferred with each packet.

Therefore, there is a need for an improved storage device and improvement method of sending data packets from a storage device.

SUMMARY OF THE DISCLOSURE

Embodiments of the present disclosure generally relate to a storage device fully utilizing a pipe interface by adaptively altering the size of data included in one or more packets sent to a host device. A maximum payload size for the packets and a reduced payload size for the packets are determined. The performance level of both the maximum payload size and the reduced payload size are then determined. The performance level of the maximum payload size is compared to the performance level of the reduced payload size to determine which payload size has the higher performance level. The payload size having the higher performance level is then selected, and the storage device sends data in packets in the size of the payload size having the higher performance level to the host device.

In one embodiment, a method of operating a storage device comprises receiving a command, determining a first data payload size, determining a second data payload size, and sending transfer layer packets comprising data in the second data payload size. The second data payload size is smaller than the first data payload size.

In another embodiment, a method of operating a storage device comprises measuring a performance level of a first data payload size, measuring a performance level of a second data payload size, comparing the performance level of the first data payload size to the performance level of the second data payload size to determine a data payload size corresponding to a higher performance level, and transferring data in the data payload size corresponding to the higher performance level. The second data payload size is smaller than the first data payload size.

In one embodiment, a storage device comprises one or more memory devices and a controller coupled to the one or more memory devices. The controller comprises a performance monitor configured to measure performance levels of one or more payload sizes and a direct memory access module coupled to the performance monitor. The direct memory access module is configured to compare the performance levels of the one or more payload sizes and select a payload size to transfer data based on the comparison of the performance levels of the one or more payload sizes.

In another embodiment, a storage device comprises one or more memory devices and a controller coupled to the one or more memory devices. The controller is configured to receive a command, determine a maximum data payload size, determine a reduced data payload size that is smaller than the maximum data payload size, determine that the reduced data payload size has a higher performance level than the maximum data payload size, and send data in the reduced data payload size.

In yet another embodiment, a storage device comprises means for determining a first payload size and a second payload size, means for measuring performance levels of the first payload size and the second payload size, means for determining whether the first payload size or the second payload size has a higher performance level, and means for sending transfer layer packets comprising data in a payload size corresponding to the higher performance level.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5 shows a latency table recording the various latencies of various read request sizes in certain embodiments.

FIGS. 9A-9B illustrate examples of how data packets comprising a MPS of data are transferred over a pipe interface, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Embodiments of the present disclosure generally relate to a storage device fully utilizing a pipe interface by adaptively altering the size of data included in one or more packets sent to a host device. A maximum payload size for the packets and a reduced payload size for the packets are determined. The performance level of both the maximum payload size and the reduced payload size are then determined. The performance level of the maximum payload size is compared to the performance level of the reduced payload size to determine which payload size has the higher performance level. The payload size having the higher performance level is then selected, and the storage device sends data in packets in the size of the payload size having the higher performance level to the host device.

Figure 1:
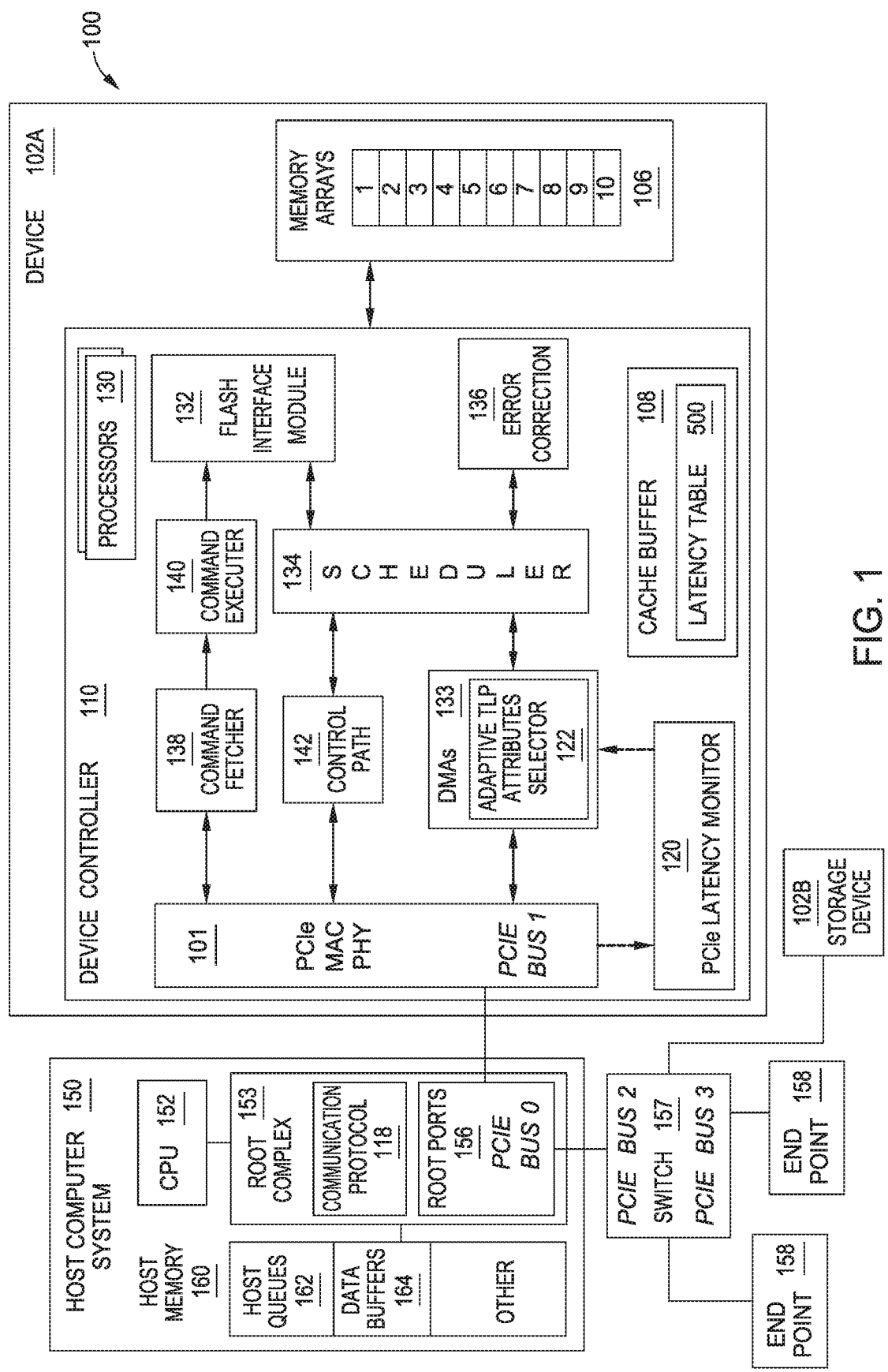
FIG. 1 is a schematic illustration of one embodiment of a system including a host and a storage device, such as a solid state drive (SSD).

FIG. 1 is a schematic illustration of one embodiment of a system 100 including an initiator or host 150 and a storage device 102, such as a solid state drive (SSD), for host 150. Host 150 may utilize a non-volatile memory (NVM) 106 included in storage device 102 to write and to read data, such as for long term memory storage. Storage device 102 may be an internal storage drive, such as a notebook hard drive or a desktop hard drive. Storage device 102 may be a removable mass storage device, such as, but not limited to, a handheld, removable memory device, such as a memory card (e.g., a secure digital (SD) card, a micro secure digital (micro-SD) card, or a multimedia card (MMC)) or a universal serial bus (USB) device. Storage device 102 may take the form of an embedded mass storage device, such as an eSD/eMMC embedded flash drive, embedded in host 150. Storage device 102 may also be any other type of internal storage device, removable storage device, embedded storage device, external storage device, or network storage device.

Host 150 may include a wide range of devices, such as computer servers, network attached storage (NAS) units, desktop computers, notebook (i.e., laptop) computers, tablet computers (i.e., "smart" pad), set-top boxes, telephone handsets (i.e., "smart" phones), televisions, cameras, display devices, digital media players, video gaming consoles, video streaming devices, and automotive applications (i.e., mapping, autonomous driving). In certain embodiments, host 150 includes any device having a processing unit or any form of hardware capable of processing data, including a general purpose processing unit, dedicated hardware (such as an application specific integrated circuit (ASIC)), configurable hardware such as a field programmable gate array (FPGA), or any other form of processing unit configured by software instructions, microcode, or firmware.

Host 150 includes a central processing unit (CPU) 152 connected to a host memory space 160, such as DRAM or other main memories. An application program may be stored to memory space 160 for execution by components of host 150. Host memory space 160 may include host queues 162, such as command submission queues and command completion queues. Host memory space 160 may include data buffers 164, such as a host data buffer.

Root complex 153 may be integrated with CPU 152 or may be a discreet component. Root complex 153 includes root ports 156. One root port 156 may be directly coupled to storage device 102A. Another root port 156 may be coupled to a switch 157, such as a PCIe switch. Switch 156 may be coupled to any appropriate end point device 158, such as storage device 102B. Therefore, storage device 102A may be directly coupled to host 150, or storage device 102B my coupled to host 150 through switch 157.

One mode of switch 156 is store-and-forward packet switching. In store-and-forward packet switching, switch 156 waits until the entire packet is received prior to forwarding the packet. For example, switch 157 may wait until receiving an entire packet from host memory space 160 prior to forwarding the entire packet to storage device 1026 connected as an end point device to switch 157.

Storage device 102 includes interface 101 for ingress of communications from host 150 to storage device 102 and egress of communications from storage device 102 to host 150 through root port 156. The interface 101 comprises mac and phy components. A link between storage device 102A, 102B, root ports 156, switch 157, or end point devices 158 may be any appropriate link, such as a PCIe link. A PCIe link may one to thirty-two lanes, depending on the number of available phys connecting two PCIe. The PCIE link is typically set during end point device initialization, such as initialization of storage device 102A, 102B.

Root Complex 153 and interface 101 operate under a communication protocol 118, such as a Peripheral Component Interface Express (PCIe) serial communication protocol or other suitable communication protocols. Other suitable communication protocols include ethernet, serial attached SCSI (SAS), serial AT attachment (SATA), any protocol related to remote direct memory access (RDMA) such as Infiniband, iWARP, or RDMA over Converged Ethernet (RoCE), and other suitable serial communication protocols. Storage device 102 may also be connected to host 150 through a switch or a bridge.

NVM 106 of storage device 102 may be configured for long-term storage of information as non-volatile memory space and retains information after power on/off cycles. NVM 106 may consist of one of more dies of NAND flash memory. Other examples of non-volatile memory include phase change memories, ReRAM memories, MRAM memories, magnetic media (including shingle magnetic recording), optical disks, floppy disks, electrically programmable read only memories (EPROM), electrically erasable programmable read only memories (EEPROM), and other solid-state memories. Magnetic media non-volatile memory may be one or more magnetic platters in storage device 102. Each platter may contain one or more regions of one or more tracks of data. NVM 106 may include one or more types of non-volatile memory.

Storage device 102 includes a controller 110 which manages operations of storage device 102, such as writes to and reads from NVM 106. Controller 110 may include one or more processors 130, which may be multi-core processors. Processor 130 handles the components of storage device 102 through firmware code.

Controller 110 may operate under NVM Express (NVMe) protocol, but other protocols are applicable. NVMe protocol is a communications interface/protocol developed for SSDs to operate over a host and storage device linked over a PCIe interface. NVMe protocol provides a command submission queue and command completion queue for access of data stored in storage device 102 by host 150. Storage device 102 may fetch or read host commands from a command submission queue of host queues 162 of host memory space 160.

Controller 110 may also include volatile a cache buffer 108 for short-term storage or temporary memory during operation of storage device 102. Cache buffer 108 may not retain stored data if powered off. Examples of cache buffer 108 include dynamic random access memories (DRAM), static random access memories (SRAM), and other forms of volatile memories.

Controller 110 executes computer-readable program code (e.g., software or firmware) executable instructions (herein referred to as "instructions"). The instructions may be executed by various components of controller 110, such as processor 130, logic gates, switches, application specific integrated circuits (ASICs), programmable logic controllers, embedded microcontrollers, and other components of controller 110.

The instructions are stored in a non-transitory computer readable storage medium. In certain embodiment, the instructions are stored in a non-transitory computer readable storage medium of storage device 102, such as in a read-only memory or NVM 106. Instructions stored in storage device 102 may be executed without added input or directions from host 150. In other embodiments, the instructions are transmitted from host 150. The controller 110 is configured with hardware and instructions to perform the various functions described herein and shown in the figures.

Storage device 102 may also include other components, such as flash interface module 132, a direct memory access (DMA) module 133, a scheduler 134, an error correction module 136, a command executor 140, and a control path 142. Flash interface module 132 interacts with NVM 106 for read and write operations. DMA module 133 executes data transfers between host 150 and storage device 102 without involvement from CPU 152. Scheduler 134 controls the data transfer while activating the control path for fetching physical page regions (PRPs), posting completion and interrupts, and activating the DMAs for the actual data transfer between host 150 and storage device 102. Error correction module 136 corrects the data fetched from the memory arrays. Command fetcher 138 fetches commands to command executor 140 for execution on flash interface module 132.

Figure 2:
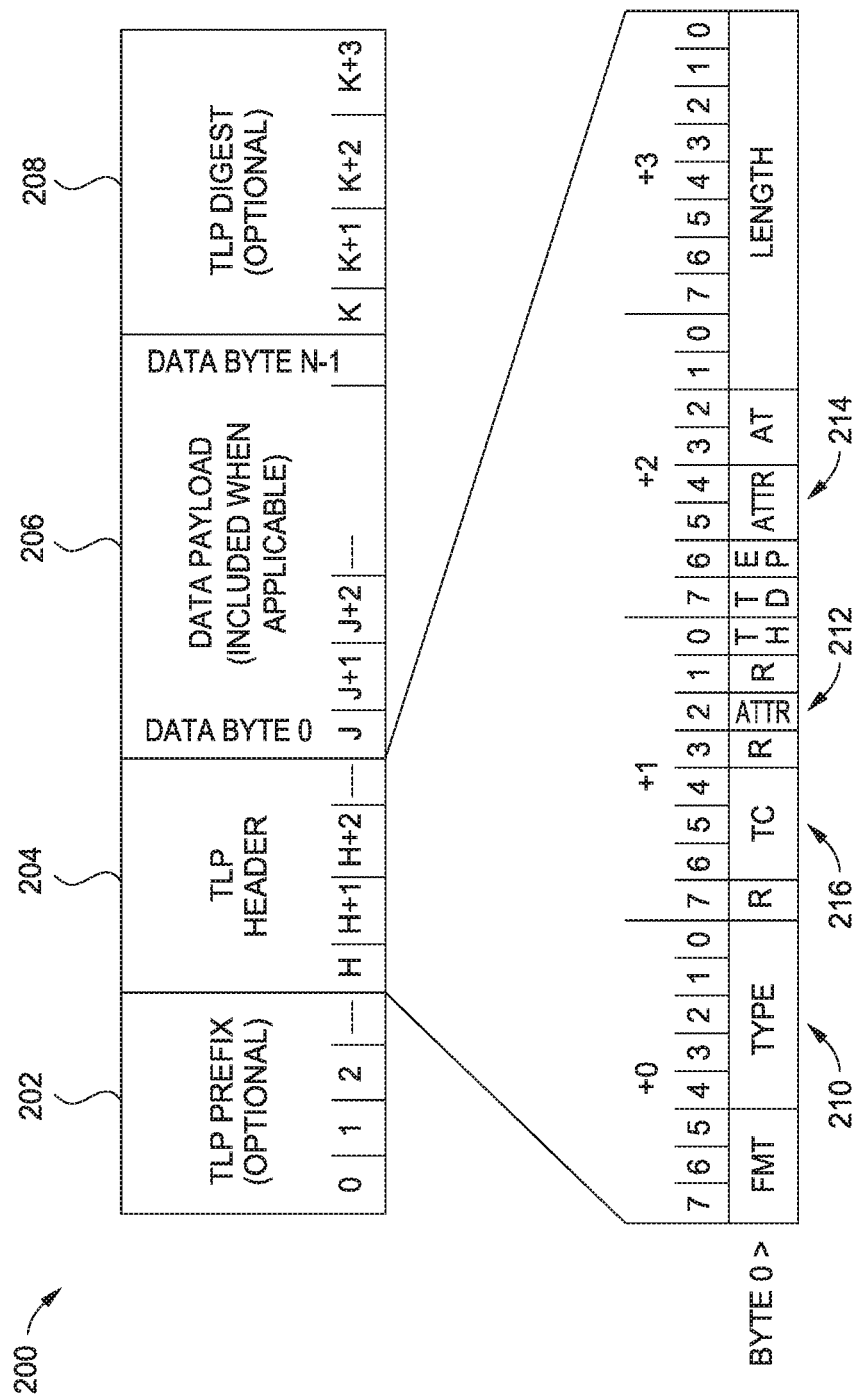
FIG. 2 is a schematic diagram of a transition layer packet (TLP) in certain embodiments.

FIG. 2 is a schematic diagram of a transition layer packet (TLP) 200 in certain embodiments. In the PCIe communication protocol, host 150 and storage device 102 may send requests to each other as TLPs 200. For example, storage device 102 may issue a host read request to host 150 to read data from host 150.

The associated data of the request is also transferred as a data payload 206 of TLPs 200. For example, a host memory read request TLP 200 may be issued by storage device 102 to host 150 and host 150 sends the requested data as data payload 206 in one or more completion TLPs 200.

TLP 200 may include an optional TLP prefix 202, a TLP header 204, the data payload 206, and an optional TLP digest 208. TLP header 204 includes a type field 210. Type field 210 may indicate types of transactions. TLP header 204 may include a first attribute field 212, a second attribute field 214, and a traffic class field 216 as part of a PCIe transaction descriptor that carries transaction information, such as address information, between root complex 153 and PCIe end point devices, such as storage device 102A, 102B.

As TLPs 200 are transferred between host 150 and storage device 102, a data link layer and physical layer are added to each TLP 200 to ensure TLP 200 arrives at the intended destination. Each TLP 200 includes a certain overhead from the added data link layer and physical layer reducing the effective data transfer rate of TLP 200. For example, TLP 200 may include an optional end-to-end cyclic redundancy checksum (ECRC) in TLP digest 208. A data link layer adds the sequence number and link layer CRC (LCRC) to TLP 200 to ensure successful transmission across the link. A physical layer adds information to mark the beginning and end of TLP 200.

In response to read requests, completion TLPs 200 contain the requested data as a data payload 206. In response to write request, write request TLPs contains the data to be written as a data payload 206. Each PCIe device is set to a certain maximum TLP payload size (MPS) for a data payload 206, such as 128 bytes, 256 bytes, 512 bytes, 1 kilobytes, 2 kilobytes, 4 kilobytes, etc.

During enumeration and configuration of connected devices, such as storage device 102A, 102B within system 100, the connected devices advertise their maximum TLP payload size supported. System 100 default setting is to use the highest common maximum TLP payload size supported along a path of TLP 200. For example, if storage device 102 is connected to host 150 through a switch (not shown), the maximum TLP payload size is limited to the highest common maximum TLP payload size of host 150, storage device 102, and switch 157. In other words, when a TLP is sent between a source PCIe device and a destination PCIe device, the TLPs are sent with a data payload size equal to or less than the lowest maximum TLP payload size setting along the TLPs' path.

Also during configuration, a maximum read request size is set into each PCIe device's control register. The maximum read request size is the maximum size of a memory read request, which in PCIe protocol is from a floor of 128 bytes to a ceiling of 4096 bytes. Computer systems are set to a highest maximum read request that is allowable for increased performance.

In a default setting, a read request is issued up to the maximum read request size to provide better system performance since fewer memory read requests are issued over the PCIe bus. However, a large read request size may increase latency due to the awaiting for the return of a completion TLP 200. For example, when switch 157 is implementing store-and-forward packet switching, switch 157 will not start transferring to the destination address until the entire TLP has been received and stored internally in switch 157. Therefore, if the accessed data has a size of 4 KB, switch 157 will store the entire 4 KB of data in switch 157 prior to forwarding the data which increases latency.

Figure 3A:
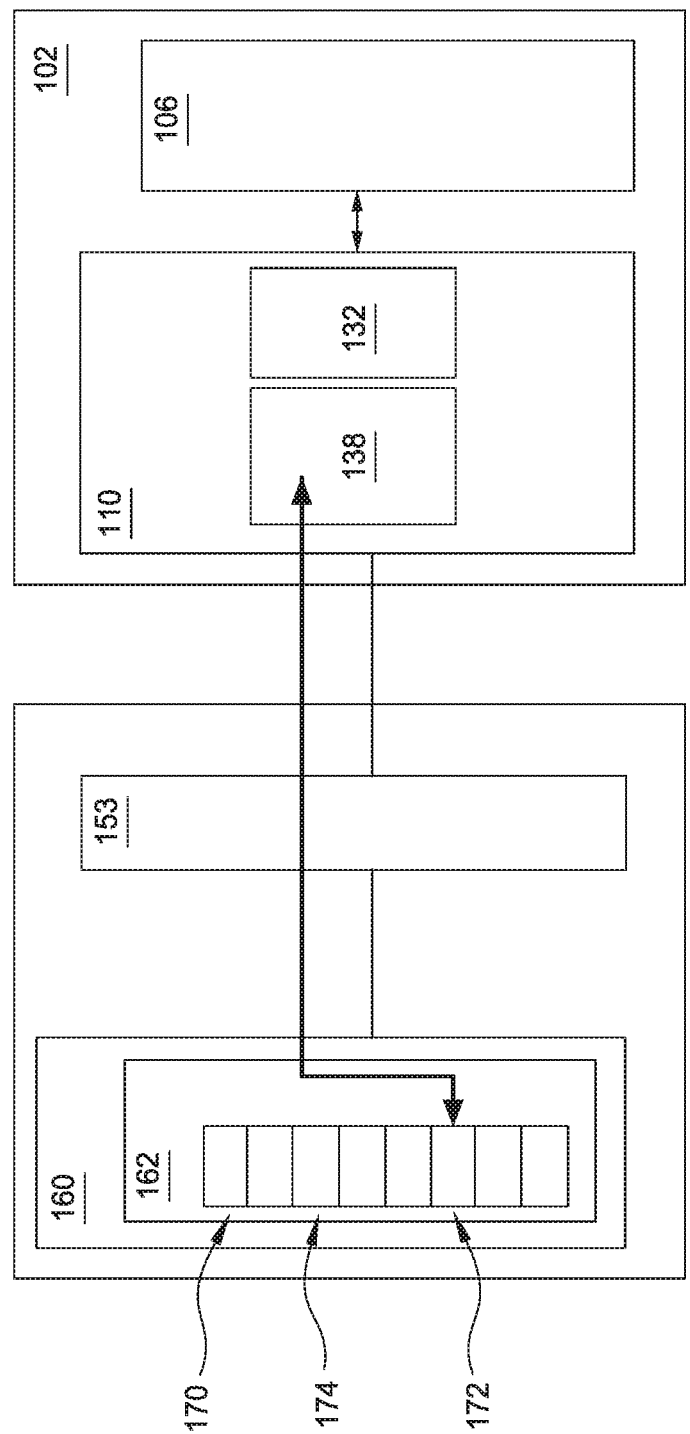
FIGS. 3A-3C are schematic illustrations of when latency from a host read request is critical in certain embodiments.
Figure 3B:
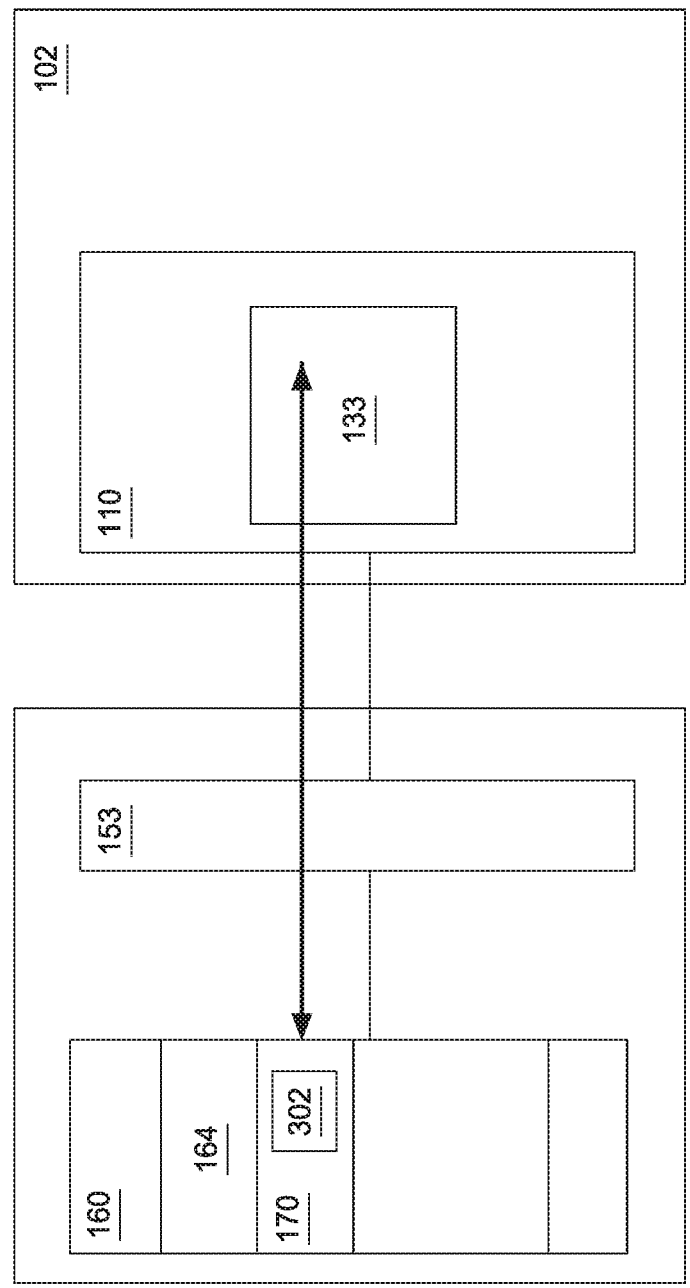

In certain instances, latency is critical or is balanced with performance. FIGS. 3A-3B are examples of when latency from a host read request is critical, although other examples are possible. FIGS. 3A-3B are described in reference to system 100 with host directly coupled to storage device 102A or coupled to storage device 102B through switch 157 of FIG. 1, although other system may be applicable. Some elements of system 100 are hidden for ease of description.

FIG. 3A is a schematic illustration of a host read command issued by storage device 102 to fetch a host command from a command submission queue 170 of host queues 162 of host memory space 160. Host commands are queues in a plurality of entries of command submission queue 170. Storage device 102 fetches host commands by command fetcher 138 issuing a host read command to an entry of command submission queue identified by a head pointer 172. Host 150 adds a new command to command submission queue 170 by adding the new command to an empty entry identified by tail pointer 174 and by incrementing the tail pointer 174 to the next empty entry. When command submission queue 170 has a low host command queue depth (i.e., a low number of commands in the queue), the latency may become more relevant since performance of system 100 may be limited by flash interface module 132 interfacing with NVM 106, such as NAND flash memory. For example, when command submission queue 170 has a low host command queue depth, storage device 102 may issue several host memory read requests in order to fetch one or more commands from command submission queue 170 rather than fetching all of the commands together using a single memory read request.

FIG. 3B is a schematic illustration of a host read command issued by storage device 102 to fetch an internal table 172 from a host memory buffer 170 of data buffer 164. For example, DMA 133 in certain scenarios must fetch internal table 172, such as address translation tables, from host memory buffer 170 when storage device 102 is using host memory buffer 170 as a data buffer. Since storage device 102 may need to fetch internal table 172 prior to accessing other data in host memory buffer 170, latency may become more relevant since performance of system 100 may be limited until internal table 172 is fetched. For example, storage device 102 may issue several host memory read requests in order to fetch portions of internal table 172 rather than fetching the entire internal table 172 together using a single memory read request.

Figure 3C:
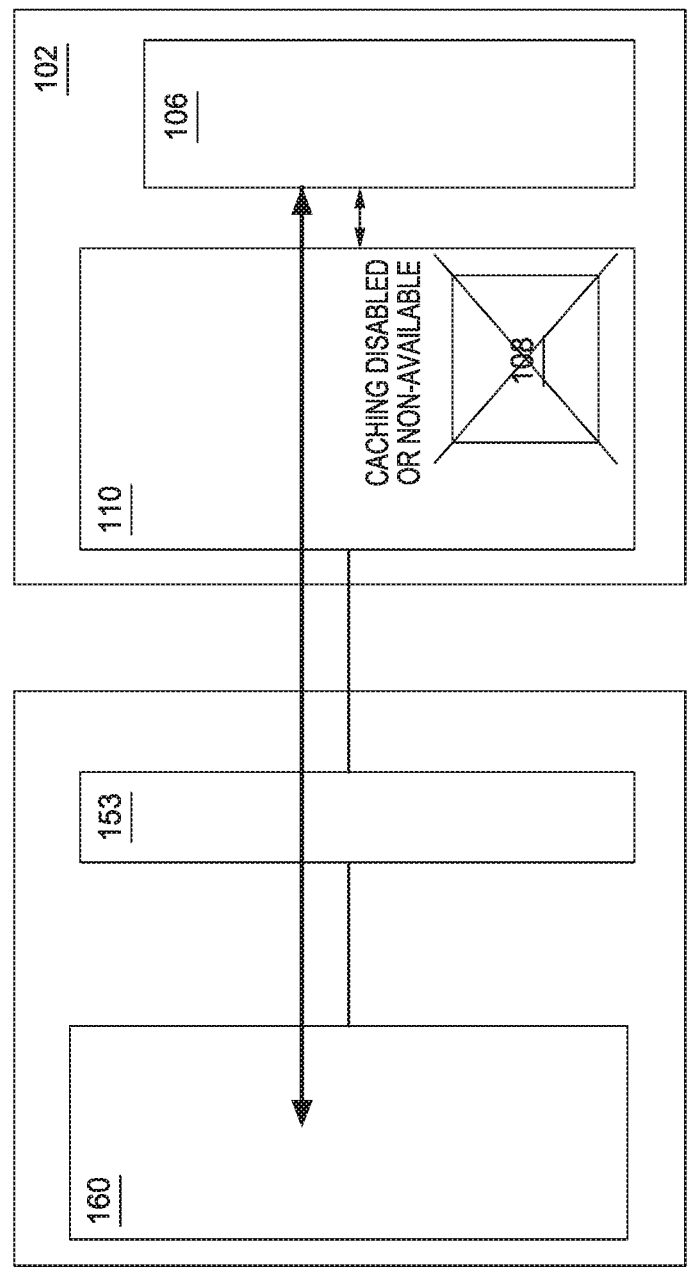

FIG. 3C is a schematic illustration of a host read command issued by storage device 102 to fetch data from host memory space 160 to be written as part of a forced unit access write operation. The forced unit access write operation to storage device 102 may involve directly writing data from host memory space 160 to NVM 106 in which caching by cache buffer 108 of storage device is disabled or not available. Latency may become more relevant since host 150 may wait for completion of the forced unit access write operation before proceeding with other operations. For example, storage device 102 may issue several host memory read requests in order to fetch portions of the data in a forced unit access write operation rather than fetching the entire data together in a single memory read request.

Figure 4:
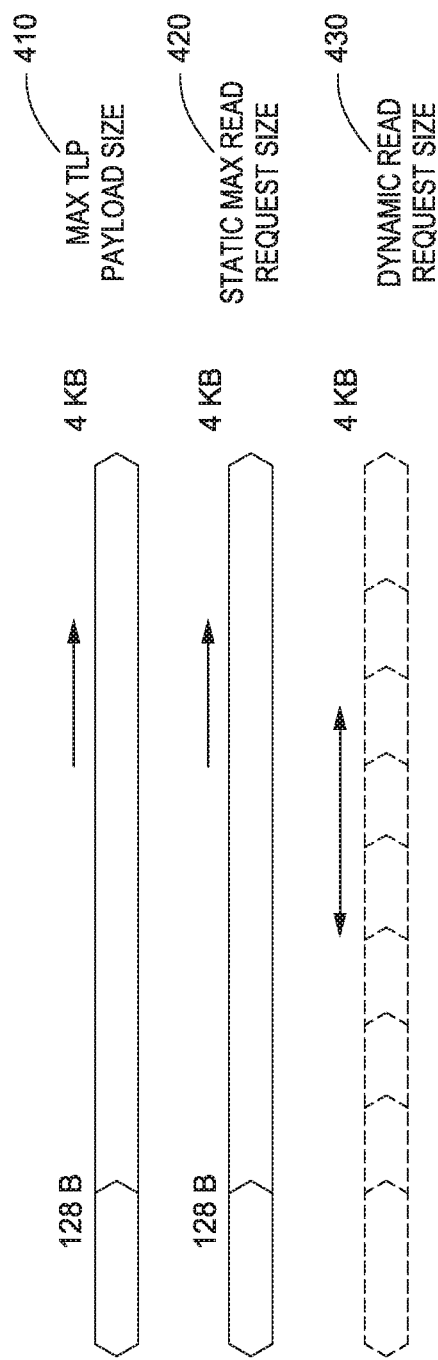
FIG. 4 is a schematic diagram of various TLP parameters under the PCIe protocol in certain embodiments.

FIG. 4 is a schematic diagram of various TLP parameters under the PCIe protocol in certain embodiments. FIG. 4 is described in reference to system 100 with host directly coupled to storage device 102A or coupled to storage device 1026 through switch 157 of FIG. 1, although other system may be applicable, and in reference to TLP 200 of FIG. 2, although other data packets may be applicable. A maximum TLP payload size 410 various from 128 bytes to 4 kilobytes and TLPs must be sent with a data payload size equal to or less than the common or lowest maximum TLP payload size along the TLPs' path. During enumeration and configuration of connected devices, such as storage device 102A, 102B within system 100, the connected devices advertise their maximum TLP payload size supported. System 100 uses the highest common maximum TLP payload size supported along a path of TLP 200. For example, if storage device 102 is connected to host 150 through a switch (not shown), the maximum TLP payload size is limited to the highest common maximum TLP payload size of host 150, storage device 102, and switch 157. In other words, when a TLP is sent between a source PCIe device and a destination PCIe device, the TLPs are sent with a data payload size equal to or less than the lowest maximum TLP payload size setting along the TLPs' path.

A static maximum read request size (MRRS) 420 is the maximum read request size statically set from a floor of 128 bytes to a ceiling of 4 kilobytes. Static MRRS 420 is set into each PCIe device's control register. Static MRRS 420 is the maximum size of a memory read request, which in PCIe protocol is from a floor of 128 bytes to a ceiling of 4096 bytes. In a default setting, host 150 sets storage device 102 to a highest level for static MRRS 420 that is allowable for increased performance. Static MRRS 420 is a static parameter configured by host 150. Storage device 102 may not issue any PCIe memory read request of a TLP data payload size 206 that exceeds this parameter. System 100 default setting is for storage device 102 to issue read request of the highest level of TLP data payload size 206 allowable by maximum TLP payload size 410 and static MRRS 420.

In various embodiments, storage device 102 issues read request with a dynamic read request size 430 which varies in size based upon whether latency is critical in fetching the data. For example, the read request TLP payload size may be less that static MRRS 420 even though the data requested has a larger size allowable by static MRRS 420. Controller 110 of storage device 102 may internally limit data payload 206 of a memory read request even though host configuration of static MRRS 420 allows data payload 206 to be larger in size. For example, host 150 may set MRRS 420 to 4 kilobytes while storage device 102 issues host read request in a dynamic read request size from 128 bytes up to 4 kilobytes and any size in between in 128 bytes increments. Dynamic read request size 430 may be determined based upon a latency desired.

In certain embodiment, a host read request may be sent with a dynamic read request size 430 based upon a desired latency. For example, storage device 102 as shown in FIG. 1 may include a latency monitor 120. The latency monitor 120 determines the time between when storage device issues a read request TLP to host 150 and when storage device receives a completion packet TLP. FIG. 5 shows certain embodiments of a latency table 500 recording the one or more latencies 510 of various read request sizes 520 in 128 bytes increments up to 4096 bytes. For example, latency monitor 120 may determine an average latency, a maximum latency, and/or a minimum latency. In certain embodiment, latency monitor 120 may determine various latencies 510 in various conditions of the link(s) between host 150 and storage device 102A, 102B. For example, various latencies 510 may be determined under a high workload 530A, medium workload 530B, and/or low workload 530C across the host-storage device link. Latency table 300 may be stored in stored in cache buffer 108.

Figure 6:
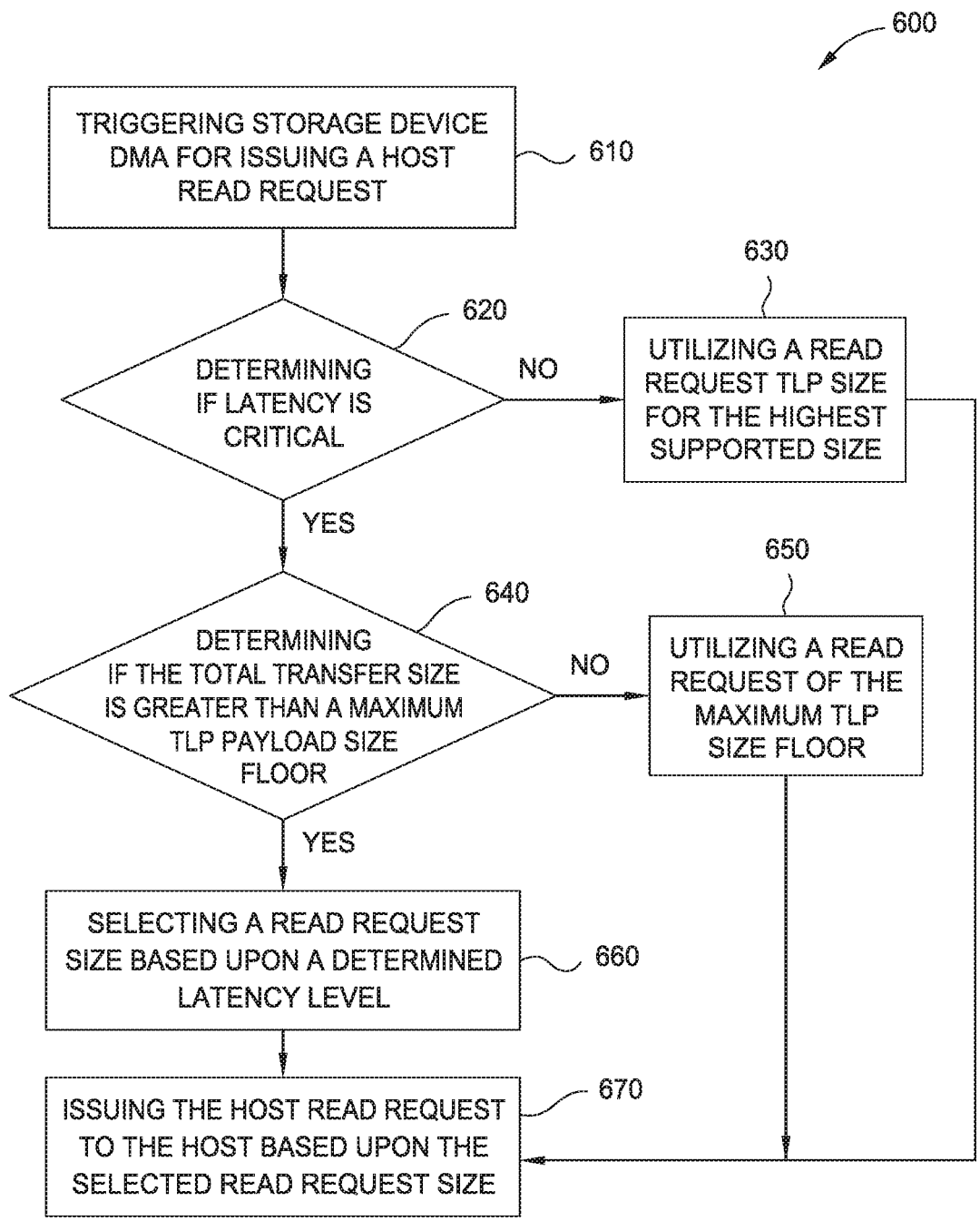
FIG. 6 is a schematic diagram illustrating one embodiment of a method of selecting a transfer size of a read requests TLP.

FIG. 6 is a schematic diagram illustrating one embodiment of a method 600 of selecting a transfer size of a read requests TLP issued to host 150 described in reference to system 100 of FIG. 1, although other system may be applicable. One or more blocks of method 600 may be performed by controller 110 executing computer-readable program code (e.g., software or firmware) executable instructions stored in storage device 102.

At block 610, DMA 133 is triggered to issue a host read request. At block 620, DMA 133 determines if latency is critical for the host read request. For example, DMA 133 may determine that the host read request is associated with a low host command submission queue depth, with a host memory buffer, with a forced unit access for a write operation, or with other operations. If latency is determined to be not critical, DMA 133 issued a host read request for the highest supported read request size allowable by maximum TLP payload size ceiling and by static MRRS 420 at block 630.

If DMA 133 determines that latency is critical, then at block 640, DMA 133 determines if the total transfer size is greater than a maximum TLP payload size floor, such as 128 bytes. If the total transfer size is not greater than a maximum TLP payload size floor, the read request is issued utilizing the maximum TLP payload size floor at block 650.

If the total transfer size is greater than a maximum TLP payload size floor, then at block 660, DMA 133 utilizes an adaptive TLP attributes selector 122 to select a read request size correlated to a desired latency. The read request size is lower than a size allowable by static MRRS 420. In some embodiments, adaptive TLP attributes selector 122 utilizes the latency table 500 generated by the latency monitor 120 to correlate which read request size to select based upon the measured latency.

At block 670, DMA 133 issue the host read request in a read request size as selected at block 660 or at block 630.

Figure 7:
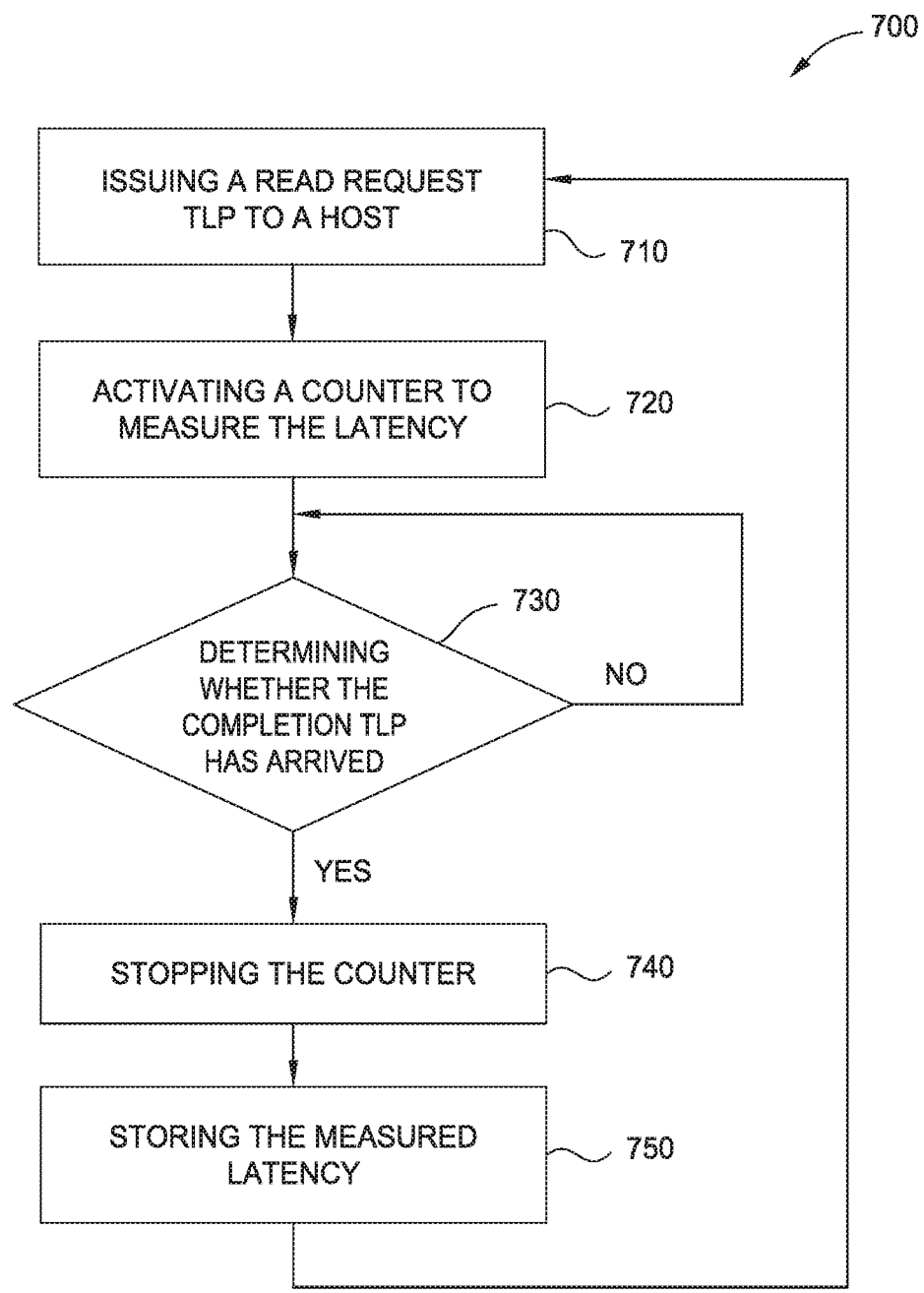
FIG. 7 is a schematic diagram illustrating one embodiment of a method of measuring a latency between various sizes of read request TLPs issued to host and associated completion TLPs.

FIG. 7 is a schematic diagram illustrating one embodiment of a method 700 of measuring a latency between various sizes of read request TLPs issued to host and associated completion TLPs described in reference to system 100 of FIG. 1, although other system may be applicable. One or more blocks of method 700 may be performed by controller 110 executing computer-readable program code (e.g., software or firmware) executable instructions stored in storage device 102.

At block 710, storage device 102 issues a TLP read request to host 150. Once or after the read request TLP is issued, the latency monitor 120 runs a counter at block 720. At block 730, whether the completion TLP from host 150 to storage device 102 has arrived is determined.

At block 740, one or after the completion TLP has arrived, the latency monitor 120 stops the counter. In the case where host 150 responds to a single memory read request with multiple completion TLPs with multiple data payloads, the latency monitor 120 stops the counter after all of the multiple completion TLPs have been received.

At block 750, the time or the latency from issuance of the read request TLP at block 710 from the arrival of the completion TLP at block 730 is store in a table, such as table 500 of FIG. 5.

Method 700 may be repeated over various read request TLP sizes and various host-storage device conditions to store a latency associated with the various read request TLP size in a table, such as table 500 of FIG. 5.

Figure 8A:
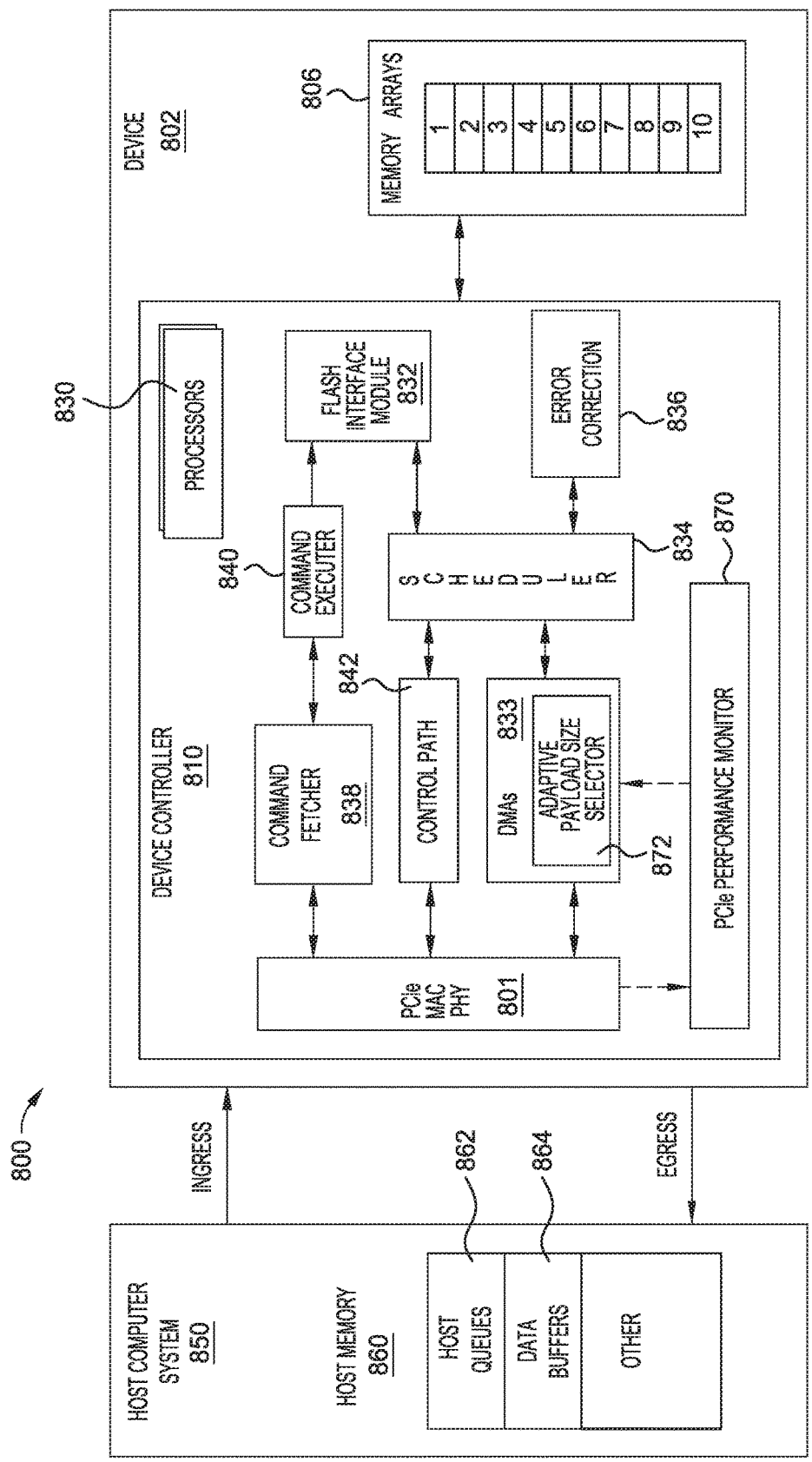
FIG. 8A illustrates a storage system comprising a host device and a storage device, according to another embodiment.

FIG. 8A illustrates a storage system 800 comprising a host device 850 and a storage device 802, according to another embodiment. Storage system 800 comprises many of the same components as storage system 100. Specifically, components 802-864 of system 800 correspond to components 102-164 of system 100. Thus, components 802-864 have been discussed in detail above in regards to FIG. 1.

Storage device 802 is configured to determine a TLP payload size that results in the highest PCIe pipe interface utilization based on the configuration of host 850. Each device in the system 800 configures a maximum payload size (MPS) for TLPs based on the restrictions and capabilities of the device. However, the MPS setting for the system 800 must not exceed the capability of any device in the system 800. As such, host 850 generally configures the MPS allowed by storage system 800, which is based on the capability of host 850. The MPS of host 850 is stored in storage device 802. Storage device 802 may store the MPS of host 850 in a device capability register located in the configuration space of storage device 802. Firmware or software of storage device 802 determines the MPS setting for the system 800. The firmware or software of storage device 802 may further determine the maximum read request size for the system 800, which is the parameter that sets the maximum size of a memory read request permitted.

While the MPS of the system 800 cannot exceed the capability of host 850, the MPS is not required to be the maximum size allowed, and may be smaller. Controller 810 of storage device 802 may determine one or more payload sizes less than or equal to the MPS to include in a TLP to transfer data. Controller 810 comprises a PCIe performance monitor 870 coupled to DMA module 833. PCIe performance monitor 870 is configured to measure a performance level of various payload sizes to determine the internal design efficiency of storage device 802. DMA module 833 of system 800 further comprises an adaptive payload size selector 872. DMA module 833 and adaptive payload size selector 872 are configured to transfer data between host 850 and storage device 802. DMA module 833 and adaptive payload size selector 872 are further configured to compare the performance levels of one or more payload sizes, and select a payload size to transfer data to host 850 based on the comparison of the performance levels of one or more payload sizes.

Figure 8B:
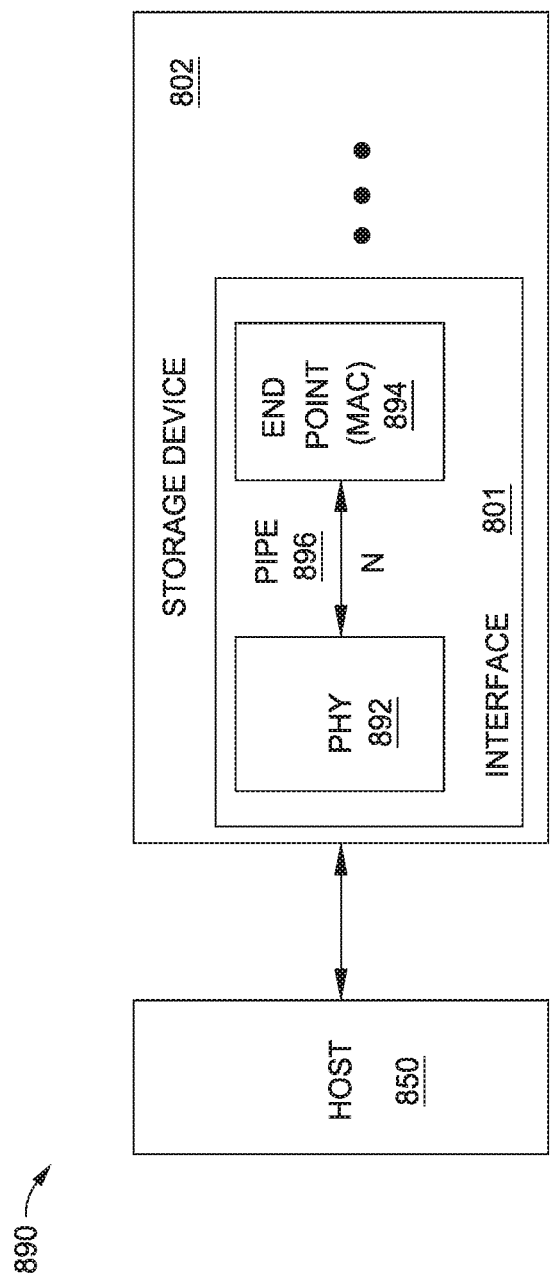
FIG. 8B illustrates a storage system comprising host device and storage device, according to yet another embodiment.

FIG. 8B illustrates a storage system 890 comprising host device 850 and storage device 802, according to another embodiment. Storage device 802 comprises interface 801. Interface 801 comprises a phy 892 coupled to an end-point (mac) 894. Phy 892 is responsible for physical layer implementation. End-point 894 is responsible for link and transport layer implantation. End-point 894 generates PCIe packets including prefix, header, payload, and suffix, as discussed above in FIG. 2. The interface between phy 892 and end-point 894 is the pipe interface 896. End-point 894 transfers the packets to phy 892 via pipe interface 896.

To determine a payload size less than the MPS that may be utilized to transfer data in a TLP, adaptive payload size selector 872 may use Equation 1.

$$(\text{payload}_{size} + \text{metadata}_{size})/\text{pipe}_{width} = N \qquad \text{Equation 1:}$$

In Equation 1, the payload size is added to the metadata size, all of which is then divided by the width of the pipe interface. To determine the reduced or optimal payload size, or the payload size less than the MPS, the payload size is varied until N is equal to an integer number. The width of the pipe interface is a fixed number while the metadata size may vary per packet. Because the metadata size may be different for each PCIe packet, Equation 1 may be used to dynamically optimize the payload size of each TLP sent to host device 850. In at least one implementation, the optimal payload size is a number close to the MPS without exceeding the MPS.

To determine the performance level of the MPS and the reduced or optimal payload size calculated in Equation 1 (i.e. pipe interface utilization), the PCIe performance monitor 870 may use Equation 2.

$$((payload_{size} + metadata_{size})/pipe_{width})/(RoundUp(payload_{size} + metadata_{size})/pipe_{width}) = efficiency \quad \text{Equation 2:}$$

In Equation 2, the numerator is the payload size added to the metadata size, all of which is then divided by the width of the pipe interface. The denominator is also the payload size added to the metadata size, all of which is divided by the width of the pipe interface, and then rounded up to the nearest whole number. When the numerator is equal to the denominator, or equal to 1, the payload size has a 100% efficiency or performance level.

FIGS. 9A-9B illustrate examples of how TLPs 900, 950 comprising a MPS of data are transferred over a pipe interface, such as pipe interface 896, respectively. TLPs 900, 950 may be transferred from storage device 802 to host 850 in system 800 of FIGS. 8A and 8B. TLP 900 and TLP 950 may be PCIe packets.

FIG. 9A illustrates TLP 900 comprising a MPS of data. In this example, the pipe bus width is 16 bytes, with each block representing 4 bytes. Thus, in each cycle, up to 16 bytes of data can be transferred. In TLP 900, the size of the packet header 902 is 20 bytes, and thus, consumes 1.25 cycles. The size of the data payload 904 is 128 bytes, which is the MPS of the system. The total size of the TLP 900 is 148 bytes, which requires 9.25 transfer cycles. Thus, in the example of FIG. 9A, the TLP 900 comprises up to 12 bytes of waste 906 in the $10^{th}$ cycle, as only 4 bytes, or one-fourth, of the $10^{th}$ cycle is utilized. As such, 100% of the host interface is failing to be utilized. To utilize 100% of the host interface, a TLP would comprise zero bytes of waste.

If a storage device needs to transfer 8 KB of data to the host, the device would need to transfer 64 TLP 900 of data. Each of the 64 TLPs 900 would comprise up to 12 bytes of waste. Thus, up to 768 bytes may be wasted in transferring the 8 KB of data in 64 TLPs comprising 128 bytes of data.

Similarly, FIG. 9B illustrates TLP 950 comprising a MPS of data. In this example, the pipe bus width is 8 bytes, with each block representing 4 bytes. Thus, up to 8 bytes of data can be transferred per cycle and only up to 4 bytes may be wasted. However, decreasing the pipe width results in increasing the clock frequency, requiring 19 cycles to transfer the data. In TLP 950, the size of the packet header 952 is 20 bytes, and thus, consumes 2.5 cycles. The size of the data payload 954 is 128 bytes, which is the MPS of the system. The total size of the TLP 950 is 148 bytes, which requires 19 transfer cycles. Thus, in the example of FIG. 9B, the TLP 950 comprises up to 4 bytes of waste 956, as only 4 bytes, or one-half, of the $19^{th}$ cycle is utilized. As such, 100% of the host interface is failing to be utilized.

Alternatively, Equation 1 may be utilized to determine a reduced payload size less than the MPS. For example, assume the MPS of a system is 512 bytes, and a storage device needs to transfer 32 KB of data to a host device. The storage device may utilize Equation 1 to determine a reduced payload size of 508 bytes. Thus, the storage device may send 64 TLPs comprising 508 bytes of data each. Each of the 64 packets would comprise zero bytes of waste. However, the storage device would need to send a $65^{th}$ packet comprising 256 bytes. The $65^{th}$ packet would comprise waste, but would be the only packet out of the 65 packets to do so.

Furthermore, the storage device may adaptively determine whether to send data in the reduced payload size or in the MPS when a command is received from a host device. Thus, the storage device can select the most efficient payload size for sending data based on the size of the command received. As such, the storage device may alternate between sending data in the MPS and the reduced payload size as needed in order to achieve the highest performance level and to fully utilize the pipe interface.

Prior to implementing the reduced payload size, the performance level of the reduced payload size may be determined to ensure the reduced payload size is both beneficial and efficient for the system. The storage device generally interacts with a host memory (i.e. host DRAM) of the host device when transferring and receiving data. Utilizing the reduced payload size when transferring data to the host memory results in the payload size being unaligned to a host memory line (i.e., the MPS). Having an unaligned data size to the host memory line may reduce the overall performance of the system due to the host memory controller having to convert each packet into a read-modify-write operation prior to writing the data to the host memory.

However, the host memory controller may have a caching mechanism instead of implementing read-modify-write operations for each packet. The caching mechanism enables the host memory controller to aggregate the received packets and then write all of the data to the host memory in a more efficient manner. The storage device may be unaware as to whether the host memory implements the caching mechanism or the read-modify-write operations. As such, the performance level of the reduced payload size may be measured in order to determine whether the performance is increased or whether any other benefits are achieved by utilizing the reduced payload size when transferring data to the host device.

Figure 10:
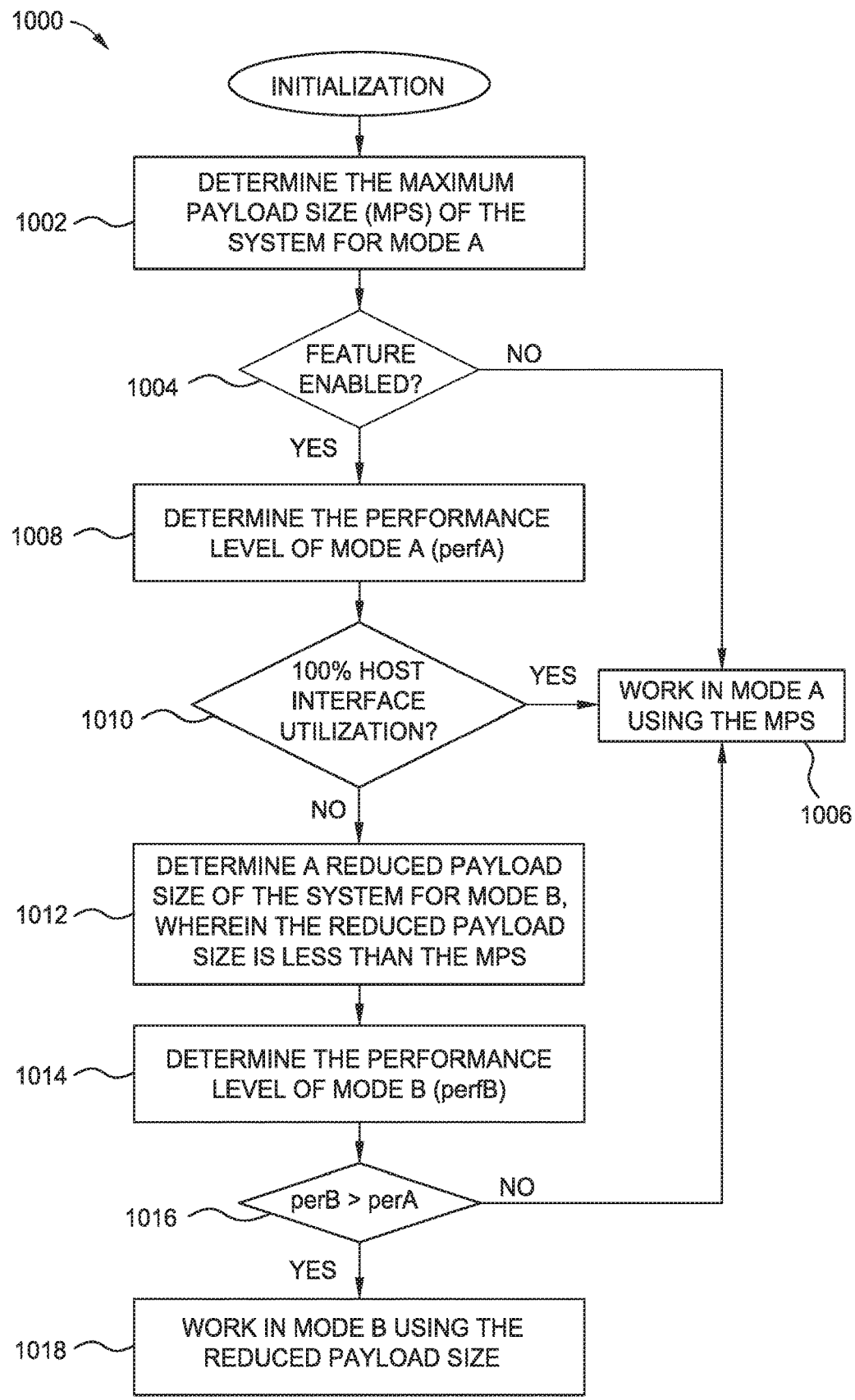
FIG. 10 illustrates a method of selecting a payload size for sending data in a TLP, according to one embodiment.

FIG. 10 illustrates a method 1000 of selecting a payload size for sending data in a TLP, according to one embodiment. Method 1000 may be utilized with storage system 800 and storage system 890 of FIGS. 8A and 8B, respectively. Method 1000 may be utilized as a storage device is transferring TLPs, such as PCIe packets, to a host device.

In operation 1002, the MPS of the system is determined for working in mode A. The MPS of the system may be received from a host, such as host 850. In operation 1004, the storage device determines whether the optimized or reduced payload size feature is enabled. If the feature is not enabled, the storage device proceeds to operation 1006. In operation 1006, the storage device works in mode A and issues packets having data payload sizes in the MPS. If the optimal payload size feature is enabled, method 1000 proceeds to operation 1008.

In operation 1008, the performance level of the MPS is determined. The performance level may be determined by the storage device issuing multiple packets having data payload sizes in the MPS. In operation 1010, the storage device determines whether 100% of the host interface is being utilized. In other words, the storage device determines whether the pipe interface is being fully utilized. If 100% of the host interface is being utilized, method 1000 proceeds to operation 1006 and works in mode A using the MPS. If 100% of the host interface or pipe interface is being utilized, the performance of the storage system is currently maximized and the host interface is fully saturated.

If 100% of the host interface is not being utilized, method 1000 proceeds to operation 1012. In operation 1012, an optimized or reduced payload size is determined for working in mode B. The reduced payload size is less than the MPS. In one embodiment, the reduced payload size is a value close to the MPS without exceeding the MPS. The reduced payload size may be determined using Equation 1 and an adaptive payload size selector, such as adaptive payload size selector 872.

In operation 1014, the performance level of the reduced payload size of mode B is determined. The performance level may be determined by the storage device issuing multiple packets having data payload sizes in the reduced payload size. In operation 1016, the storage device determines whether the performance level of mode B is greater than the performance level of mode A. If the performance level of mode B is greater than the performance level of mode A, method 1000 proceeds to operation 1018. In operation 1018, the storage device works in mode B using the reduced payload size. If the performance level of mode B is less than the performance level of mode A, method 1000 proceeds to operation 1006 and works in mode A using the MPS.

Thus, as the storage device is transferring TLPs to the host device, the storage device may adaptively alter the size of data included in each packet in order to fully utilize the pipe interface. Method 1000 may be repeated one or more times as the storage device transfers TLPs to the host or as the storage device receives commands from the host. As such, the storage device may switch back and forth between working in mode A and working in mode B as needed, allowing for the performance of the storage device to be maximized.

By determining a reduced payload size and comparing the performance level of the reduced payload size to the performance level of the MPS, 100% of the host or pipe interface, or as close to 100% as the system is capable of achieving, may be utilized.

In one embodiment, a method of operating a storage device comprises receiving a command, determining a first data payload size, determining a second data payload size, and sending transfer layer packets comprising data in the second data payload size. The second data payload size is smaller than the first data payload size.

The first data payload size may be a maximum data payload size. The method may further comprise comparing a performance measurement of the first data payload size to a performance measurement of the second data payload size prior to sending the transfer layer packets. The method may further comprise determining that the performance measurement of the second data payload size is higher than the performance measurement of the first data payload size prior to sending the transfer layer packets. The second data payload size may be determined based on a width of a pipe bus.

In another embodiment, a method of operating a storage device comprises measuring a performance level of a first data payload size, measuring a performance level of a second data payload size, comparing the performance level of the first data payload size to the performance level of the second data payload size to determine a data payload size corresponding to a higher performance level, and transferring data in the data payload size corresponding to the higher performance level. The second data payload size is smaller than the first data payload size.

The data may be transferred in a transfer layer packet. The transfer layer packet may comprise metadata. The performance level of the second data payload size may be measured based on a width of a pipe bus. The performance level of the second data payload size may be measured based on the metadata.

In one embodiment, a storage device comprises one or more memory devices and a controller coupled to the one or more memory devices. The controller comprises a performance monitor configured to measure performance levels of one or more payload sizes and a direct memory access module coupled to the performance monitor. The direct memory access module is configured to compare the performance levels of the one or more payload sizes and select a payload size to transfer data based on the comparison of the performance levels of the one or more payload sizes.

The direct memory access module may be further configured to transfer the data. The payload size selected may be a payload size having the highest performance level measurement. The payload size selected may be less than a maximum payload size. The payload size selected may be a maximum payload size. The controller may further comprise a command executer coupled to the direct memory access module. The controller may further comprise a command fetch coupled to the command executer.

In another embodiment, a storage device comprises one or more memory devices and a controller coupled to the one or more memory devices. The controller is configured to receive a command, determine a maximum data payload size, determine a reduced data payload size that is smaller than the maximum data payload size, determine that the reduced data payload size has a higher performance level than the maximum data payload size, and send data in the reduced data payload size.

The controller may be further configured to measure a performance level of the reduced data payload size prior to determining that the reduced data payload size has a higher performance level than the maximum data payload size. The controller may be further configured to measure a performance level of the maximum data payload size prior to determining that the reduced data payload size has a higher performance level than the maximum data payload size. The one or more memory devices may comprise non-volatile memory devices. The data may be transferred in a transfer layer packet comprising metadata. The reduced data payload size may be determined based on a pipe bus width and the size of the metadata in the transfer layer packet.

In yet another embodiment, a storage device comprises means for determining a first payload size and a second payload size, means for measuring performance levels of the first payload size and the second payload size, means for determining whether the first payload size or the second payload size has a higher performance level, and means for sending transfer layer packets comprising data in a payload size corresponding to the higher performance level.

The storage device may further comprise one or more non-volatile memory devices. The first payload size may a maximum payload size, and the second payload size may be a payload size less than the maximum payload size. The second payload size may be determined from a pipe bus width and a metadata size.

While the foregoing is directed to embodiments of the present disclosure, other and further embodiments of the disclosure may be devised without departing from the basic scope thereof, and the scope thereof is determined by the claims that follow.

What is claimed is:

1. A method of operating a storage device connected to a host device through a switch, comprising:

receiving a command;
determining a first data payload size, the first data payload size being a highest common maximum data payload size between the storage device, the host device, and the switch;
determining a second data payload size, the second data payload size being smaller than the first data payload size; and
sending transfer layer packets comprising data in the second data payload size, wherein the second data payload size is dynamically determined to reduce a total amount of waste sent within each transfer layer packet.

2. The method of claim 1, wherein the first data payload size is a maximum read request size.

3. The method of claim 1, further comprising comparing a performance measurement of the first data payload size to a performance measurement of the second data payload size prior to sending the transfer layer packets.

4. The method of claim 3, further comprising determining that the performance measurement of the second data payload size is higher than the performance measurement of the first data payload size prior to sending the transfer layer packets.

5. The method of claim 1, wherein the second data payload size is determined based on a width of a pipe bus.

6. A method of operating a storage device connected to a host device through a switch, comprising:
measuring a performance level of a first data payload size, the first data payload size being a highest common maximum data payload size between the storage device, the host device, and the switch;
determining, dynamically, a second data payload size, the second data payload size being smaller than the first data payload size;
measuring a performance level of the second data payload size, wherein the performance level of the second data payload size is measured based on a width of a pipe bus;
comparing the performance level of the first data payload size to the performance level of the second data payload size to determine a data payload size corresponding to a higher performance level; and
transferring data in the data payload size corresponding to the higher performance level.

7. The method of claim 6, wherein the data is transferred in a transfer layer packet.

8. The method of claim 7, wherein the transfer layer packet comprises metadata.

9. The method of claim 8, wherein the performance level of the second data payload size is further measured based on the metadata.

10. A storage device connected to a host device through a switch, comprising:
one or more memory devices; and
a controller coupled to the one or more memory devices, the controller comprising:
a performance monitor configured to measure performance levels of one or more payload sizes, a first payload size of the one or more payload sizes being a highest common maximum data payload size between the storage device, the host device, and the switch, and a second payload size of the one or more payload sizes being dynamically determined to reduce a total amount of waste sent within one or more transfer cycles of data; and
a direct memory access module coupled to the performance monitor, wherein the direct memory access module is configured to:
compare the performance levels of the one or more payload sizes; and
select a payload size to transfer data based on the comparison of the performance levels of the one or more payload sizes.

11. The storage device of claim 10, wherein the direct memory access module is further configured to transfer the data.

12. The storage device of claim 10, wherein the payload size selected is a payload size having the highest performance level measurement.

13. The storage device of claim 12, wherein the payload size selected is less than a maximum payload size.

14. The storage device of claim 12, wherein the payload size selected is the highest common maximum payload size.

15. The storage device of claim 10, wherein the controller further comprises a command executer coupled to the direct memory access module.

16. The storage device of claim 15, wherein the controller further comprises a command fetch coupled to the command executer.

17. A storage device connected to a host device through a switch, comprising:
one or more memory devices; and
a controller coupled to the one or more memory devices, wherein the controller is configured to:
receive a command;
determine a maximum data payload size, wherein the maximum payload size is a highest common maximum data payload size between the storage device, the host device, and the switch;
determine a reduced data payload size that is smaller than the maximum data payload size, wherein the reduced data payload size is determined based on a pipe bus width;
determine that the reduced data payload size has a higher performance level than the maximum data payload size; and
send data in the reduced data payload size.

18. The storage device of claim 17, wherein the controller is further configured to measure a performance level of the reduced data payload size prior to determining that the reduced data payload size has a higher performance level than the maximum data payload size.

19. The storage device of claim 17, wherein the controller is further configured to measure a performance level of the maximum data payload size prior to determining that the reduced data payload size has a higher performance level than the maximum data payload size.

20. The storage device of claim 17, wherein the one or more memory devices comprise non-volatile memory devices.

21. The storage device of claim 17, wherein the data is transferred in a transfer layer packet comprising metadata.

22. The storage device of claim 21, wherein the reduced data payload size is further determined based on the size of the metadata in the transfer layer packet.

23. A storage device connected to a host device through a switch, comprising:
means for determining a first payload size and a second payload size;
means for measuring performance levels of the first payload size and the second payload size, wherein the second payload size is a highest common maximum payload size between the storage device, the host device, and the switch, and wherein the first payload size is smaller than the second payload size;

means for determining whether the first payload size or the second payload size has a higher performance level; and means for sending transfer layer packets comprising data and metadata in a payload size corresponding to the higher performance level, wherein the first payload size is dynamically determined based on a pipe bus width and a size of the metadata to reduce a total amount of waste sent within each transfer layer packet.

24. The storage device of claim 23, further comprising one or more non-volatile memory devices.

* * * * *